US011640579B2

(12) United States Patent
Pareek (10) Patent No.: US 11,640,579 B2
(45) Date of Patent: May 2, 2023

(54) METHOD, SYSTEM, SERVER PROCESSING SYSTEM COMPUTER READABLE MEDIUM FOR MANAGING INVENTORY (71) Applicant: MASTERCARD INTERNATIONAL INCORPORATED, Purchase, NY (US)

(72) Inventor: Ravi Pareek, Maharashtra (IN)

(73) Assignee: Mastercard International Incorporated, Purchase, NY (US)

(*) Notice: Subject to any disclaimer, the term of this patent is extended or adjusted under 35 U.S.C. 154(b) by 0 days.

(21) Appl. No.: 17/367,273

(22) Filed: Jul. 2, 2021

(65) Prior Publication Data

US 2021/0334743 A1 Oct. 28, 2021

Related U.S. Application Data

(63) Continuation of application No. 15/962,630, filed on Apr. 25, 2018, now Pat. No. 11,080,650.

(30) Foreign Application Priority Data

May 15, 2017 (SG) .......................... 10201703945W (51) Int. Cl.
*G06Q 10/08* (2012.01)
*G06Q 50/30* (2012.01)
(Continued)

(52) U.S. Cl.
CPC ....... *G06Q 10/087* (2013.01); *G06Q 10/0835* (2013.01); *G06Q 10/08345* (2013.01); *G06Q 30/0201* (2013.01); *G06Q 50/30* (2013.01)

(58) Field of Classification Search
CPC .......... G06Q 10/087; G06Q 10/08345; G06Q 10/0835; G06Q 30/0201; G06Q 50/30; G06Q 10/08
See application file for complete search history.

(56) References Cited

U.S. PATENT DOCUMENTS

2002/0161674 A1* 10/2002 Scheer ............... G06Q 10/0631
705/28
2003/0061125 A1* 3/2003 Hoffman ................ G06Q 10/06
705/28

(Continued)

OTHER PUBLICATIONS

Scott Mitchell, http://www.inmotionhosting.com/support/edu/prestashop-15/working-with-multi-shops/multistore-share-inventory, Aug. 8, 2012, 6 pages.

*Primary Examiner* — A. Hunter Wilder
*Assistant Examiner* — Joseph M Mutschler
(74) *Attorney, Agent, or Firm* — Loza & Loza, LLP (57) ABSTRACT

Disclosed is a method, server processing system, system and computer readable medium for managing inventory. In one aspect, the method includes, in a server processing system, steps of: receiving, from a plurality of merchant devices including a first and second merchant device associated with a first and second merchant respectively, inventory data and a plurality of merchant locations which are stored in a data store; receiving, from the first merchant device, data indicative of a requested good that is not stocked by the first merchant; determining that the requested good is stocked by a second merchant using the inventory data of one or more merchants that are located within a proximity of the location of the first merchant; and transferring, to the second merchant device, a request to facilitate provision of the requested good to a customer of the first merchant.

15 Claims, 8 Drawing Sheets

(51) Int. Cl.
*G06Q 30/02* (2012.01)
*G06Q 10/087* (2023.01)
*G06Q 10/0834* (2023.01)
*G06Q 30/0201* (2023.01)
*G06Q 10/0835* (2023.01)

(56) References Cited

U.S. PATENT DOCUMENTS

| | | |
|---|---|---|
| 2006/0095346 A1 | 5/2006 | Gambhir |
| 2010/0114955 A1 | 5/2010 | Thayer |
| 2013/0066753 A1 | 3/2013 | Doyle et al. |
| 2014/0101001 A1* | 4/2014 | Brown ................ G06Q 10/087 705/28 |
| 2015/0032502 A1 | 1/2015 | Green et al. |
| 2015/0242922 A1 | 8/2015 | Zamer |
| 2018/0308051 A1* | 10/2018 | Nemati ................ G06Q 10/087 |

* cited by examiner

METHOD, SYSTEM, SERVER PROCESSING SYSTEM COMPUTER READABLE MEDIUM FOR MANAGING INVENTORY

CROSS-REFERENCE TO RELATED APPLICATION

This application is a U.S. National Stage filing under 35 U.S.C. § 119, based on and claiming benefits of and priority to Singapore Patent Application No. 10201703945W filed on May 15, 2017. The entire disclosure of the above application is incorporated herein by reference.

TECHNICAL FIELD

The present invention relates to a method, server processing system and computer readable medium for managing inventory between merchants.

BACKGROUND

A common problem that merchant's face relates to the management of inventory, particularly in relation to inventory which may be perishable. Merchants may be required to predict sales of the perishable items in order to order an appropriate amount of inventory. In the event that a merchant has under-predicted future sales, the merchant may run out of inventory resulting in a loss of sales. In the event that a merchant has over-predicted future sales, the merchant may have inventory that perishes which can no longer be sold.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

In a first aspect there is provided a method for managing inventory, the method including, in a server processing system:

receiving, from a plurality of merchant devices including a first and second merchant device associated with a first and second merchant respectively, inventory data and a plurality of merchant locations which are stored in a data store;

receiving, from the first merchant device, data indicative of a requested good that is not stocked by the first merchant;

determining that the requested good is stocked by a second merchant using the inventory data of one or more merchants that are located within a proximity of the location of the first merchant; and transferring, to the second merchant device, a request to facilitate provision of the requested good to a customer of the first merchant.

In a second aspect there is provided a server processing system for managing inventory, wherein the server processing system is configured to:

receive, from a plurality of merchant devices including a first and second merchant device associated with a first and second merchant respectively, inventory data and a plurality of merchant locations which are stored in a data store;

receive, from the first merchant device, data indicative of a requested good that is not stocked by the first merchant;

determine that the requested good is stocked by a second merchant using the inventory data of one or more merchants that are located within a proximity of the location of the first merchant; and transfer, to the second merchant device, a request to facilitate provision of the requested good to a customer of the first merchant.

In a third aspect there is provided a non-transitory computer storage medium including executable instructions which, when executed by one or more processors, configure a server processing system for managing inventory, wherein the server processing system is configured to:

receive, from a plurality of merchant devices including a first and second merchant device associated with a first and second merchant respectively, inventory data and a plurality of merchant locations which are stored in a data store;

receive, from the first merchant device, data indicative of a requested good that is not stocked by the first merchant;

determine that the requested good is stocked by a second merchant using the inventory data of one or more merchants that are located within a proximity of the location of the first merchant; and transfer, to the second merchant device, a request to facilitate provision of the requested good to a customer of the first merchant.

In a fourth aspect there is provided a system including:

the server processing system according to the second aspect; and the plurality of merchant devices including the first merchant device and the second merchant device.

BRIEF DESCRIPTION OF THE FIGURES

Example embodiments should become apparent from the following description, which is given by way of example only, of at least one preferred but non-limiting embodiment, described in connection with the accompanying figures.

DETAILED DESCRIPTION

The described method and system enables a merchant to be able to facilitate a sale of one or more goods which are not in stock by arranging for the provision of the requested inventory item by another merchant. This minimises a likelihood of disappointment for a consumer as a desired good is likely to be available. Furthermore, individual merchants need not be overly concerned about maintaining (and paying for) storage place for storage as their respective stock levels can be reduced if there are "shared" stocks of goods amongst groups of merchants. In addition, the optimisation of stock levels for each respective merchant can minimise wastage of goods, particularly for goods with a shelf life.

In general terms, whenever the consumer visits a merchant which does not possess stocks of a desired good, a preferably close-by location of another merchant which possesses the desired good will be provided instead, and the consumer still proceeds to make payment at the merchant, but will need to obtain the desired good from the other merchant, either by hand, or by arranging to have the desired good delivered to the consumer.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

Figure 1:
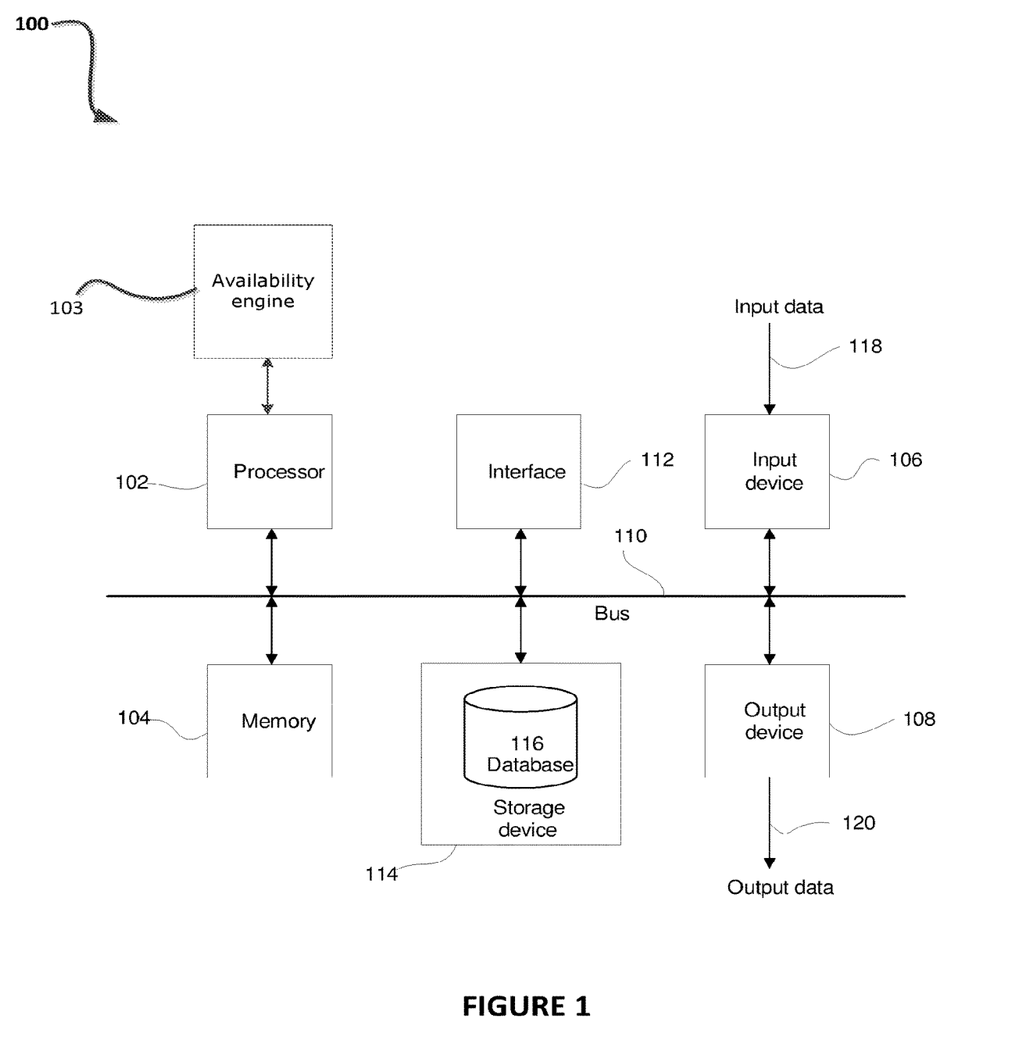
FIG. 1 illustrates a functional block diagram of an example processing system that can be utilised to embody or give effect to a particular embodiment.

Particular embodiments of the present invention can be realised using a processing system, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 also can be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100. The processor 102 also includes an availability engine 103 which is configured to determine stock levels of specific goods at respective merchants. The availability engine 103 can attend to requests of inventory levels at various merchants and provide requisite information on respective inventory levels.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116 and/or the memory 104. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like. The interface 112 generally enables results of the availability engine 103 to be transmitted to a merchant server(s) and to also receive requests for use of the availability engine 103.

Figure 2:
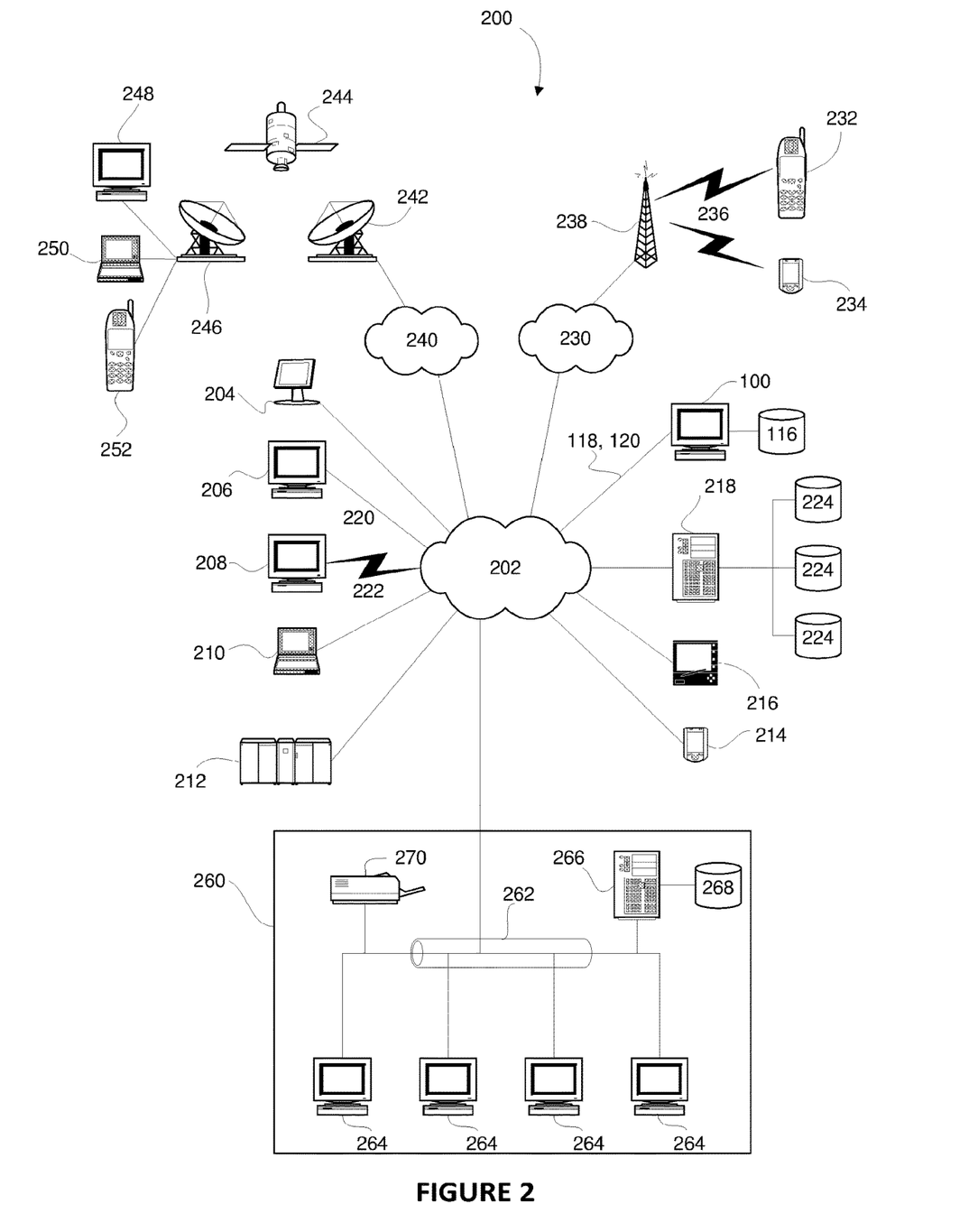
FIG. 2 illustrates an example network infrastructure that can be utilised to embody or give effect to a particular embodiment.

The processing device 100 may be a part of a networked communications system 200, as shown in FIG. 2. Processing device 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilised. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilising wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250 or satellite telephone 252, can thereby communicate with network 202. A local network 260, which for example may be a private network, LAN, etc., may also be connected to network 202. For example, network 202 could be connected with Ethernet 262 which connects terminals 264, server 266 which controls the transfer of data to and/or from database 268, and printer 270. Various other types of networks could be utilised.

The processing device 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, Ethernet, token ring, FDDI ring, star, etc., networks, or mobile telephone networks, such as GSM, CDMA or 3G, etc., networks, and may be wholly or partially wired, including for example optical fibre, or wireless networks, depending on a particular implementation.

Figure 3:
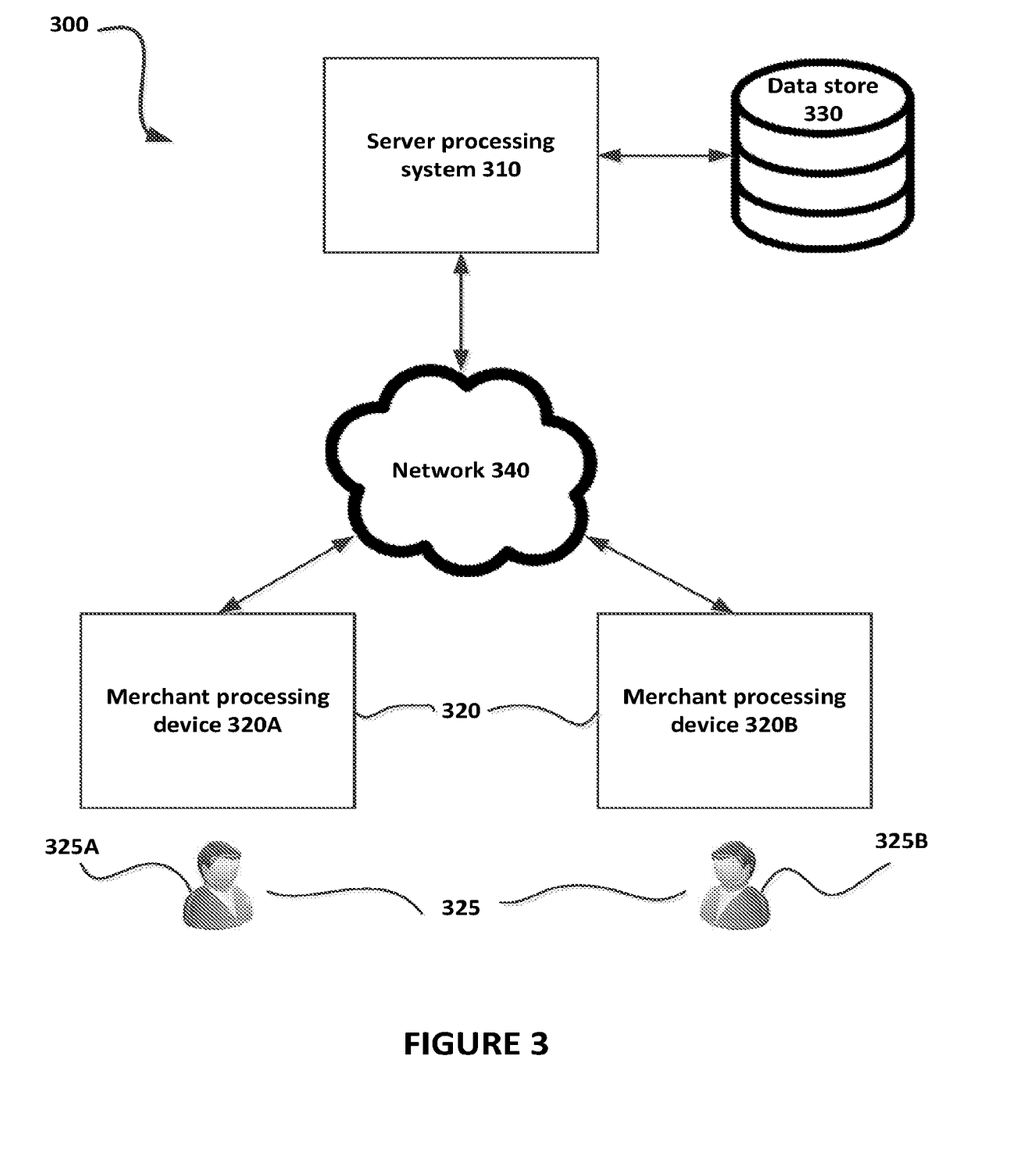
FIG. 3 is a system diagram representing an example system for managing inventory.

Referring to FIG. 3, there is shown an example system 300 for managing inventory.

In particular, the system 300 includes a server processing system 310 (similar with the processing system 100) in communication with a plurality of merchant devices 320 via one or more networks 340. The server processing system 310 includes or has access to a data store 330. Each merchant device 320 is associated with a merchant 325. The plurality of merchant devices 320 includes a first merchant device 320A associated with a first merchant 325A and a second merchant device 320B associated with a second merchant 325B. Whilst in FIG. 3 the plurality of merchants 325 is shown as two merchants 325A, 325B and the plurality of merchant devices 320 is shown as two merchant devices 320A, 320B, it will be appreciated that the system can include more than two merchants 325 and more than two merchant devices 320.

Figure 4:
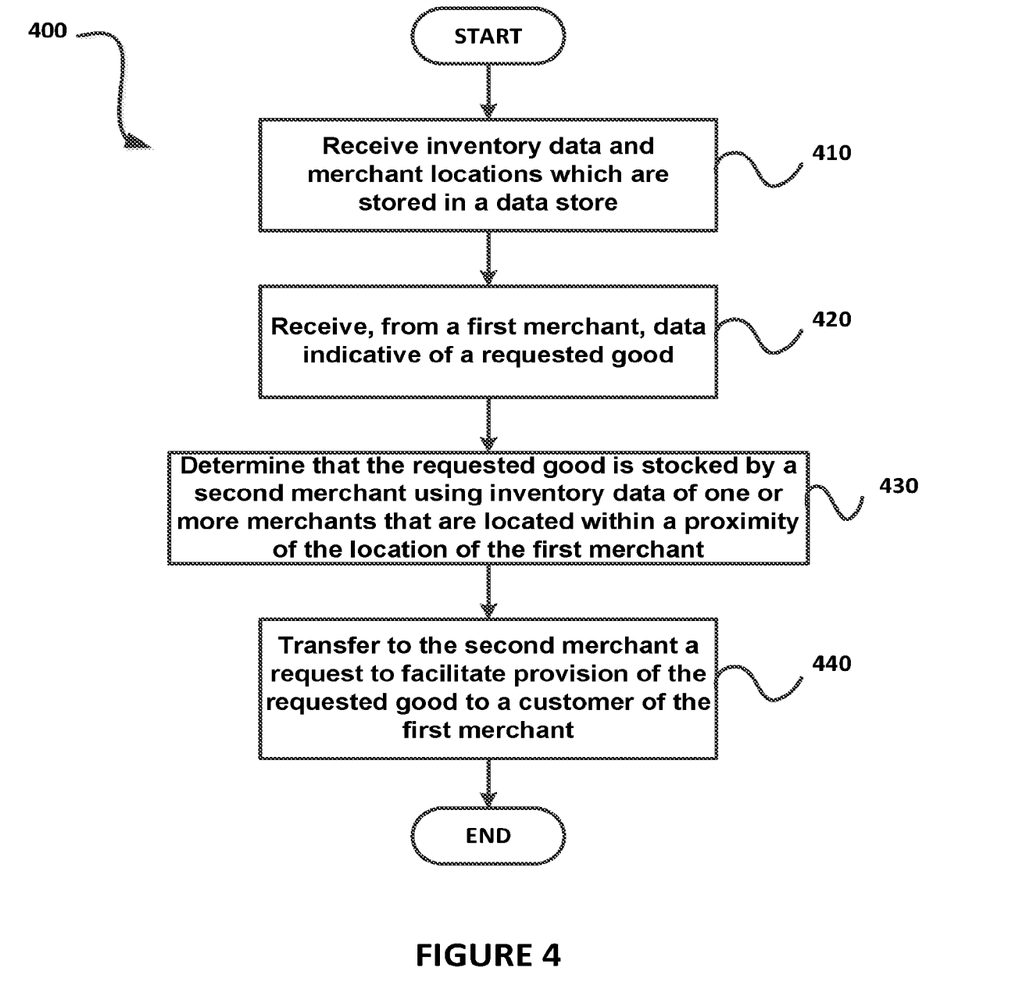
FIG. 4 is a flowchart representing an example method performed by a server processing system for managing inventory.

Operation of the system 300 will now be described with reference to FIG. 4 which shows a flowchart representing a method 400 performed by the server processing system 310 for managing inventory.

In particular, at step 410 the method 400 includes the server processing system 310, particularly an availability engine of the system 310, receiving, from the plurality of merchant devices 320, inventory data and a plurality of merchant locations which are stored in a data store 330.

At step 420, the method 400 includes the server processing system 310 receiving, via an interface of the system 310, from the first merchant device 320A, data indicative of a requested good that is not stocked by the first merchant 325A.

At step 430, the method 400 includes the server processing system 310, particularly the availability engine of the system 310, determining that the requested good is stocked by a second merchant 325B using the inventory data of one or more merchants 325 that are located within a proximity of the location of the first merchant 325A.

At step 440, the method 400 includes the server processing system 310 transferring, to the second merchant device 320B, a request to facilitate provision of the requested good to a customer of the first merchant 325A.

It will be appreciated that the above described arrangement provides a number of benefits over traditional approaches. Advantageously, the described method 400 and system 300 enable a merchant to still be able to facilitate a sale of one or more goods which are not stocked by arranging for the provision of the requested inventory item by another merchant.

Figure 5:
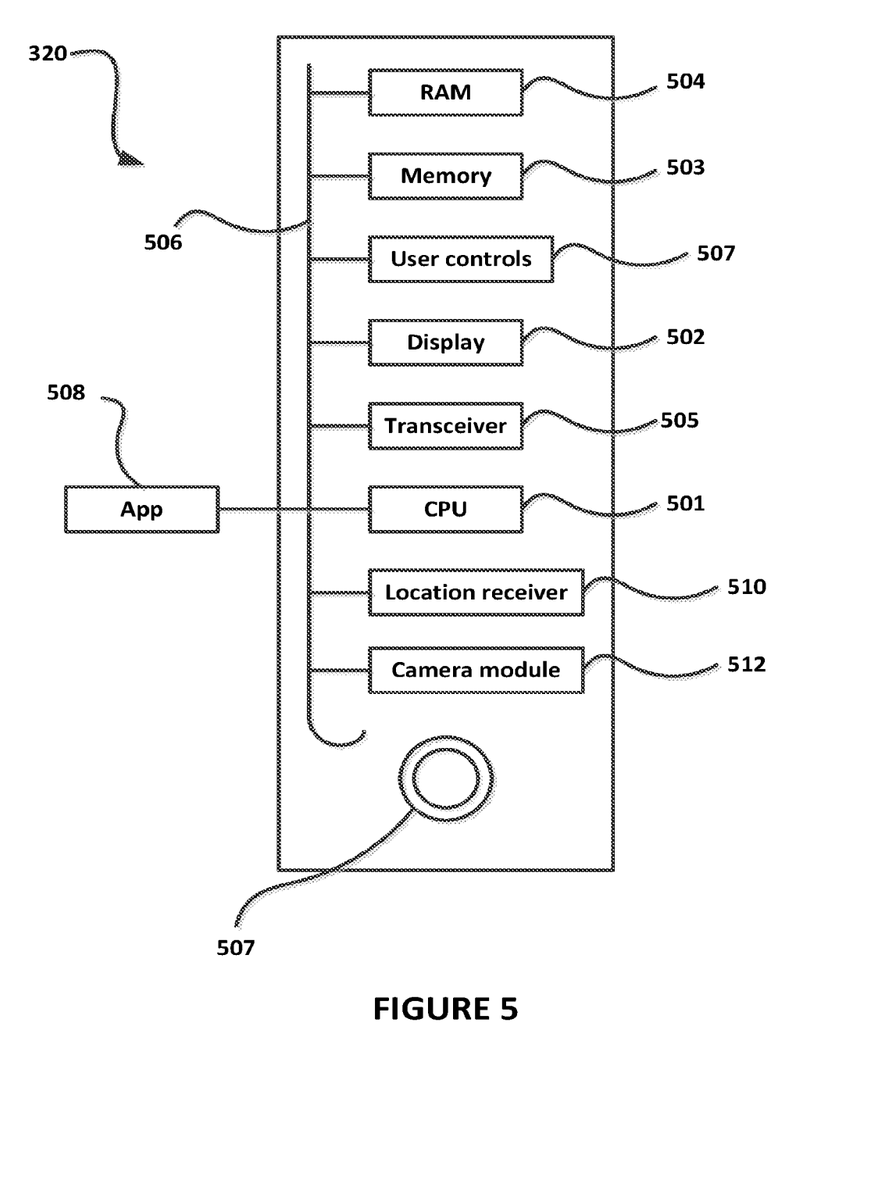
FIG. 5 is a schematic diagram of an example merchant device.

Referring to FIG. 5 there is shown a schematic diagram of an example of a merchant device 320. In particular, the merchant device 320 may be a handheld computer device such as a smart phone or a PDA such as one manufactured by Apple™, LG™, HTC™, Research In Motion™, or Motorola™. The merchant device 320 may include a mobile computer such as a tablet computer. As shown, the merchant device 320 includes a display 502, non-volatile memory 503, random access memory ("RAM") 504, one or more processing components 501, a transceiver component 505 that includes one or more transceivers and user controls 507, a location receiver 510 and a camera module 512 coupled together in electronic communication via a bus 506.

Although the components depicted in FIG. 5 represent physical components, FIG. 5 is not intended to be a hardware diagram; thus many of the components depicted in FIG. 5 may be realized by common constructs or distributed among additional physical components. Moreover, it is certainly contemplated that other existing and yet-to-be developed physical components and architectures may be utilized to implement the functional components described with reference to FIG. 5.

The display 502 generally operates to provide a presentation of content to a user, and may be realized by any of a variety of displays (e.g., CRT, LCD, HDMI, micro-projector and OLED displays). And in general, the non-volatile memory 303 functions to store (e.g., persistently store) data and executable code including code that is associated with the functional components of a browser component and applications, and in one example, an inventory sharing network application 508 executing on the merchant device 320. In some embodiments, for example, the non-volatile memory 503 includes bootloader code, modem software, operating system code, file system code, and code to facilitate the implementation of one or more portions of the inventory sharing network application 508 as well as other components well known to those of ordinary skill in the art that are not depicted for simplicity.

In many implementations, the non-volatile memory 503 is realized by flash memory (e.g., NAND or ONENAND memory), but it is certainly contemplated that other memory types may be utilized as well. Although it may be possible to execute the code from the non-volatile memory 503, the executable code in the non-volatile memory 503 is typically loaded into RAM 504 and executed by one or more of the processing components 501.

The one or more processing components 501 in connection with RAM 504 generally operate to execute the instructions stored in non-volatile memory 503 to effectuate the functional components. As one of ordinarily skill in the art will appreciate, the one or more processing components 501 may include a video processor, modem processor, DSP, graphics processing unit (GPU), and other processing components.

The transceiver component 505 includes one or more transceiver chains, which may be used for communicating with external devices via wireless networks. Each of the one or more transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Figure 6:
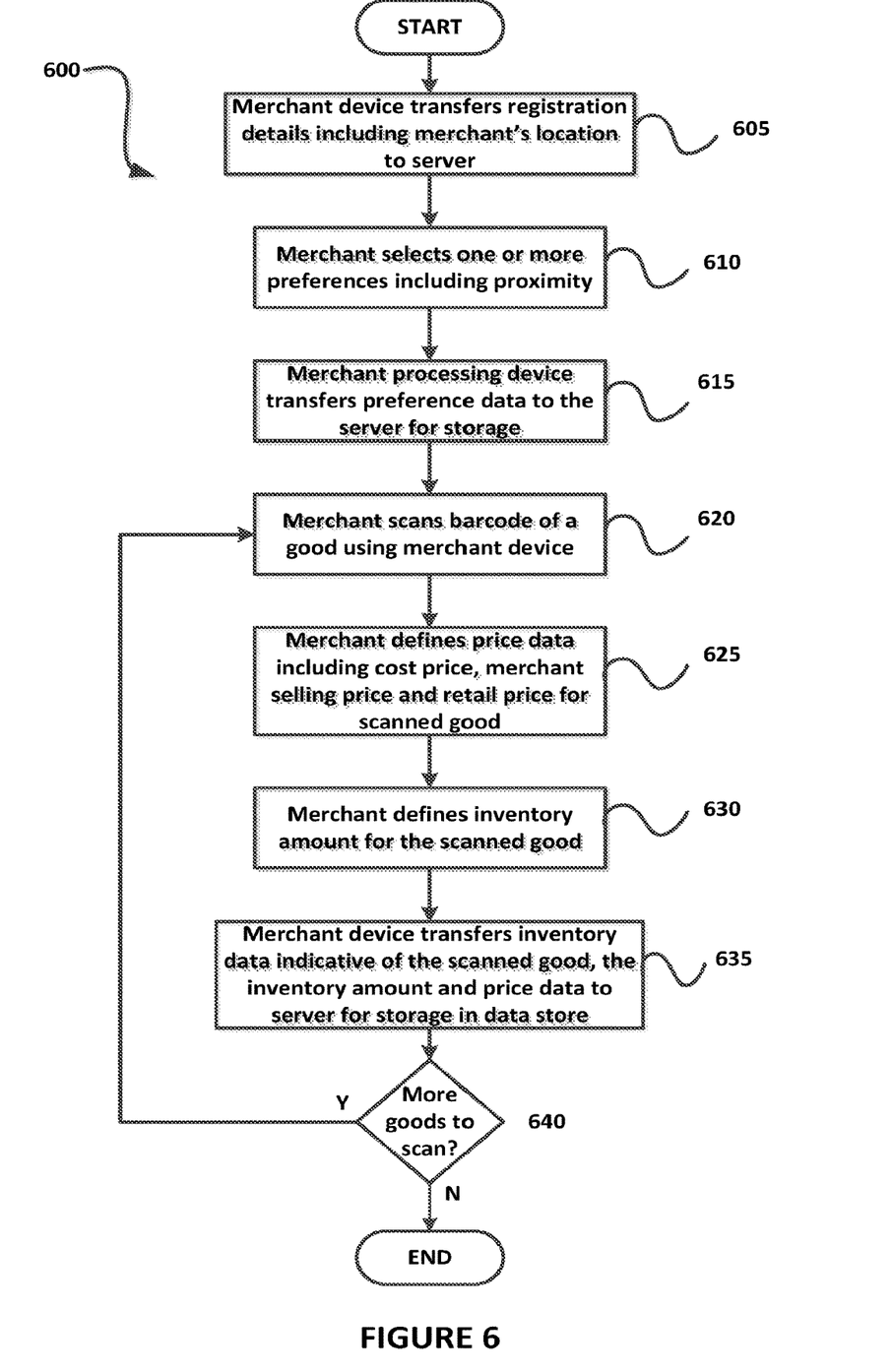
FIG. 6 is a flowchart representing an example method of a merchant supplying data to a server for storage in a data store including inventory data.

Referring to FIG. 6 there is shown a flowchart representing an example method 600 of a merchant 325 supplying data, including inventory data, to the server processing system 310 for storage in the data store 330.

In particular, step 605 the method 600 includes the merchant 325 operating the merchant device 320 to transfer registration details to the server processing system 310. In particular, the registration details can include the location of the merchant's premises. In one form, the merchant device 320 is configured by the application 508 to request a current location using the location receiver 510 which is presented to the merchant 325 via the display 502 requesting confirmation via an input device 507. In the event that the merchant is located at a different location to the business premises of the merchant 325, the merchant 325 can interact with the application 508 via the input device 507 to provide a different location of the merchant 325. Once the correct details are supplied, the merchant 325 can interact with the application 508 requesting transfer of the registration details to the server processing system 310 for storage in the data store 330. The data store 330 is generally provided in the form of a central database. In response to receiving the registration details, the server processing system 310 can be configured to create a new entry in the central database 330.

At step 610, the method 600 includes the merchant 325 selecting, using the merchant device 320 executing the application 508, one or more preferences including a proximity of an inventory network for the merchant 325. In particular, the proximity can be defined as a distance such as a radius from the merchant's location, wherein one or more other merchants 325 which are located within the proximity are part of the merchant inventory network that can be used to facilitate provision of a requested good which the merchant 325 may not currently stock for one reason or another. In one form, the application 508 can suggest a default proximity, such as 1 kilometer. In the event the merchant is happy with the default proximity, the server processing system 310 stores in the merchant's entry in the central database the default proximity.

However, in some instances, the default proximity may not be appropriate. For example, the default proximity may not encompass a suitable number of other merchants which are part of the inventory system managed by the server processing system 310. In particular, the server processing system 310 may conduct a search of the central database 330 to determine any merchant entries which are located within the default proximity and transfer data plotting the other identified merchants on a map interface for the merchant 325 to review. The map interface map present a circle representing the inventory network proximity centred about the merchant's location with other merchants which are located within the proximity which are also registered with the inventory system being highlighted by an icon or marker within the circle on the map. In the event that the merchant 325 would like to adjust the proximity, the merchant 325 can interact with the map interface via the one or more user controls 507 such as a touch screen to graphically adjust the size of the proximity.

For example, the merchant 325 may select a portion of the circle and drag the circle inwards toward the merchant location to contract the radial distance defining the proximity or drag the circle outwards away from the merchant location to expand the radial distance defining the proximity. Upon the proximity being adjusted by the user, the adjusted proximity is transferred back to the server processing system 310 to determine the one or more other merchants 325 which are located in the adjusted proximity which is transferred back to the merchant device 310 for presentation in the map interface to the merchant 325. The proximity can be adjusted a number of times until the merchant is satisfied with the defined proximity. It will be appreciated that other preferences may also be defined by the merchant.

At step 615, the preference data including the defined proximity is transferred to the server processing system 310 for storage in the merchant's entry in the central database 330.

At step 620, the method 600 includes the merchant 325 scanning a barcode of a good using the camera module 512 of the merchant device 320. In particular, the application 508 may present an image capturing interface to capture an image of the barcode of the good. The merchant 325 can select a button of the image capturing interface to capture an image of the barcode. Alternatively, the application 508 can continually analyse an image/video feed provided by the camera module 512 to determine if the barcode of the good is orientated appropriately for the barcode to be analysed correctly, wherein upon the detection of the correct orientation of the barcode, the application 508 automatically captures an image of the barcode using the camera module 512. The application 508 then automatically performs image analysis or character recognition to determine an identifier, such as a Unique Product Code (UPC), EAN/UCC-13 code, or the like which is represented by the barcode of the good.

In the event that the barcode is not captured correctly, the merchant 325 may be requested to try and capture the barcode again using the camera module 512 of the merchant device 320. However, in the event that the identifier is determined by the analysis performed by the merchant device 320, the merchant device 320 can transfer a request to the server processing system 310 operating a barcode lookup service or to another processing system operating a barcode lookup service to determine details of the scanned good. Details of the scanned good can then be communicated back to the merchant device 320 for formatting and presentation to the merchant 325 within an interface of the application 508. The merchant 325 can then check the returned details to confirm that the details of the good are correct. If the details are correct the merchant 325 can provide feedback to continue to step 625. If the details are incorrect, the merchant 325 can interact with the application 508 to correct the details using the input device 507 and then proceed to step 625.

At step 625, the method 600 includes the merchant 325 providing price data in relation to the scanned good. In particular, the merchant is requested to provide a merchant selling price which is the cost that the merchant is willing to sell the good to another merchant, the cost price of the good and the retail price.

At step 630, the method 600 includes the merchant inputting, using the input device 507 of the merchant device 320, an inventory amount for the good. For example, instead of scanning every instance of a good, the merchant 325 can input an inventory amount indicative of the number of instances of the good that is in stock.

At step 635, the method 600 includes the merchant device 320 transferring inventory data indicative of the scanned good, the inventory amount and the price data, to the server processing system 310 for storage in the central database 310, and also for processing at the availability engine.

At step 640, the method 600 includes the merchant 325 indicating whether one or more further goods need to be added to the inventory data for the merchant. In the event that one or more further goods need to be scanned, the method 600 proceeds back to step 620 to repeat steps 620 to 640 until all goods have been scanned and stored in the central database 330 by the server processing system 310. In the event that no further goods need to be scanned, the method 600 ends.

Figure 7:
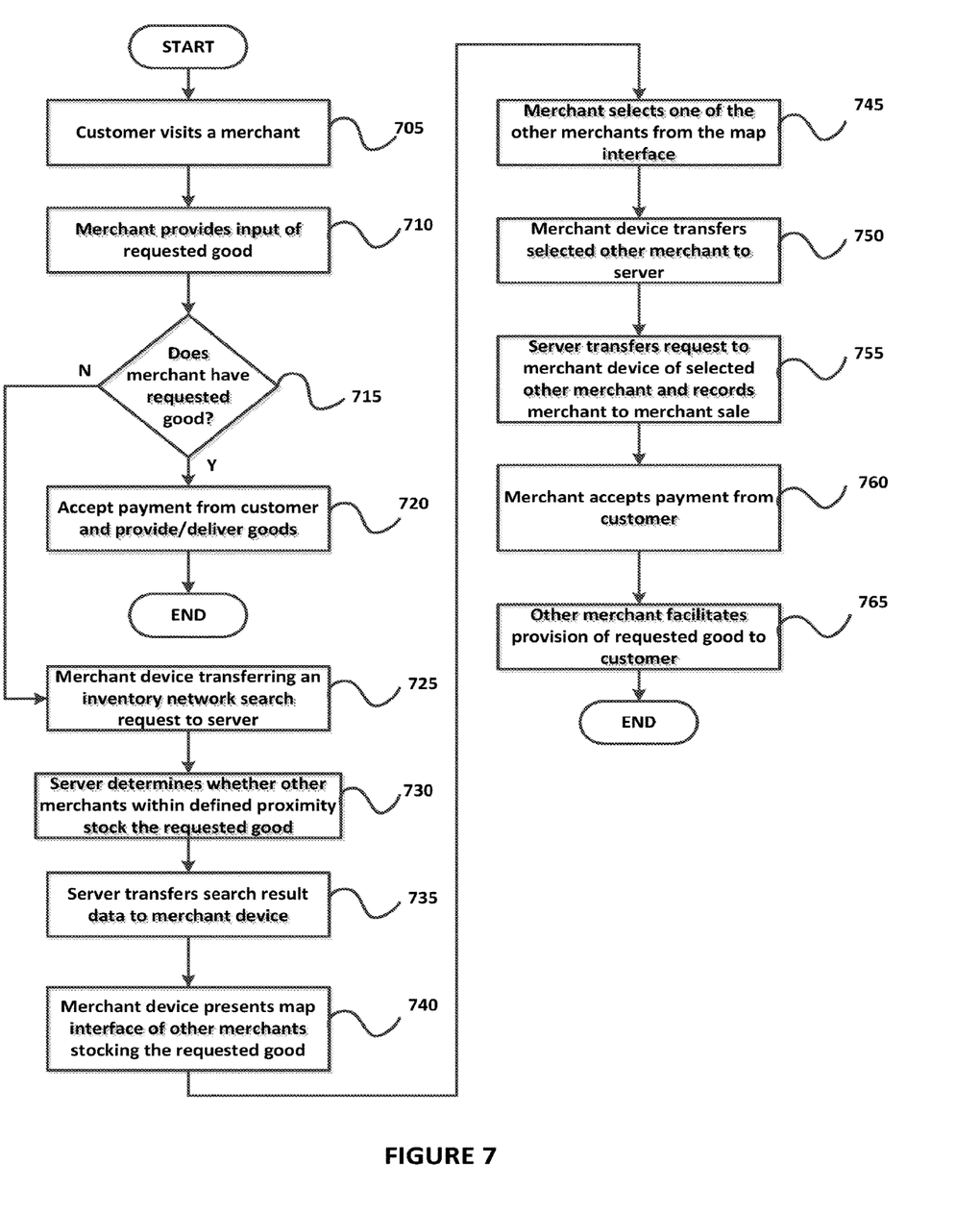
FIG. 7 is a flowchart representing an example method of a merchant requesting provision of a requested good by another merchant.

Referring to FIG. 7 there is shown a flowchart representing an example method 700 of the merchant 325A requesting provision of a requested good by another merchant 325B.

In particular, at step 705, the method 700 includes a customer visiting the premises of a merchant 325A. At step 710, the merchant inputs into the merchant device a good requested by the customer.

At step 715, the method 700 includes determining, using the application 508, whether the merchant 325 has the requested good in stock. In one form, the merchant device 325 maintains a local copy in memory 503 of the merchant's inventory data such the merchant device 325 can conduct a search for the request good via the local copy of the merchant's inventory data. However, in other instances, data indicative of the good (i.e. a product name) is transferred to the server processing system 310 to search the inventory data of the merchant via the availability engine. Results of either search are presented via the display 502 of the merchant device 320.

In the event that the merchant 325 stocks the requested good, the method 700 proceeds to step 720 to accept payment from the customer and to provide the good to the customer or to deliver the good to a customer defined location.

In the event of an unsuccessful determination to step 715, the method 700 proceeds to step 725 which includes the merchant device 320 transferring an inventory network search request to the server processing system 310. In particular, in response to a negative determination at step 715, the method 700 may automatically proceed to step 725. However, in other arrangements, the merchant 325 may be requested to confirm via the interface of the application 508 whether an inventory network search request is to be performed in relation to the requested good.

At step 730, the method 700 includes the server processing system 310 determining whether one or more other merchants within the defined proximity stock the request good. In particular, the server processing system 310 determines the one or more other merchants which are located within the proximity. The one or more other merchants which are part of the merchant's inventory network can already be stored in the central database 330 for the merchant 325, and thus the server processing system retrieves from the central database 330 data indicative of the one or more other merchants. Once the one or more other merchants of the merchant's inventory network are determined, the server processing system 310 searches the inventory data for the one or more other merchants to determine if any of the other merchants stock the requested good.

At step 735, the method 700 includes the server processing system 310 transferring search result data to the merchant device 320. The search result data may be indicative of any other merchant which stocks the requested good based on the inventory data stored in the central database 330, the inventory amount of the request good stocked by each other merchant, the merchant selling price of the requested good, and the distance between each other merchant and the merchant's location.

At step 740, the method 700 includes the merchant device 320 displaying the search result data. In one form, at least some of the search results are presented within a map interface. In particular, markers may be presented within a map showing the merchant's inventory network proximity and a marker representing each other merchant located within the proximity which stocks the requested good. Each marker on the interface can include the name of the other merchant, the merchant sale price, the inventory amount of the requested good, and a distance from the merchant's premises. Alternatively, only a portion of this data is presented by each marker until highlighted. For example, the preference data for the merchant may define that the merchant selling price is to be presented by each marker on the map. Upon selection of one of the markers from the map interface, the other information provided by the server processing system for the selected other merchant is presented to the merchant. Additionally or alternatively, the interface presenting the map interface can also include a tabular list with the other merchants which are sorted according to one or more criteria defined within preference settings of the merchant. For example, the merchant may want the other merchants sorted according to merchant selling price. Alternatively, the merchant may want the other merchants sorted according to distance from the merchant.

Alternatively, the merchant may define a rule which sorts the other merchants according to a weighted combination of merchant selling price and distance. Alternatively, the merchant may define a rule which sorts the other merchants according to delivery costs of each merchant.

At step 745, the method 700 includes the merchant 325 selecting one of the other merchants presented within the search results interface to provide the requested good to the customer. In particular, upon selecting one of the markers from the map interface, a button may be presented to the merchant allowing the merchant to send a request to the selected merchant to facilitate the provision of the requested good to the customer. Additionally, the merchant 325 can interact with the application interface to indicate whether the requested good is to be collected by the customer from the premises of the selected other merchant, delivered by the selected other merchant to the customer at the merchant's premises, or delivered to a location specified by the customer.

At step 750, the method 700 includes the merchant device 320 transferring the selected other merchant to the server processing system 310. Additionally, the request can be indicative of whether the requested good is to be collected by the customer from the premises of the selected other merchant, delivered by the selected other merchant to the customer at the merchant's premises, or delivered to a location specified by the customer.

At step 755, the method 700 includes the server processing system 310 transferring a request to the other merchant device of the selected other merchant and records in the data store a merchant to merchant sale. In particular, the merchant is charged according to the merchant price defined by the selected other merchant for the requested good. The request is indicative of the requested good and whether the requested good is to be collected by the customer from the premises of the selected other merchant, delivered by the selected other merchant to the customer at the merchant's premises, or delivered to a location specified by the customer.

At step 760, the method 700 includes the merchant 325 accepting payment from the customer. The amount that is charged may be the other merchant's retail price which is retrieved from the central database 330 and transferred to the merchant device 320 for arranging payment. However, it will be appreciated that a default profit margin may be charged by the merchant.

At step 765, the method 700 includes the selected other merchant facilitating the provision of the requested good to the customer. For example, the requested good may be collected by the customer from the premises of the selected other merchant, delivered by the selected other merchant to the customer at the merchant's premises, or delivered to a location specified by the customer.

It will be appreciated that is some circumstances steps 760 and 765 can be swapped as payment to the merchant may only be performed upon receiving the requested good.

It will be appreciated that the customer may require a particular amount of the good. As such, the search request may only return one or more other merchants which have the requested amount in stock. Alternatively, the merchant 325 can select multiple other merchants to provide portions of the requested amount of the requested good.

Figure 8:
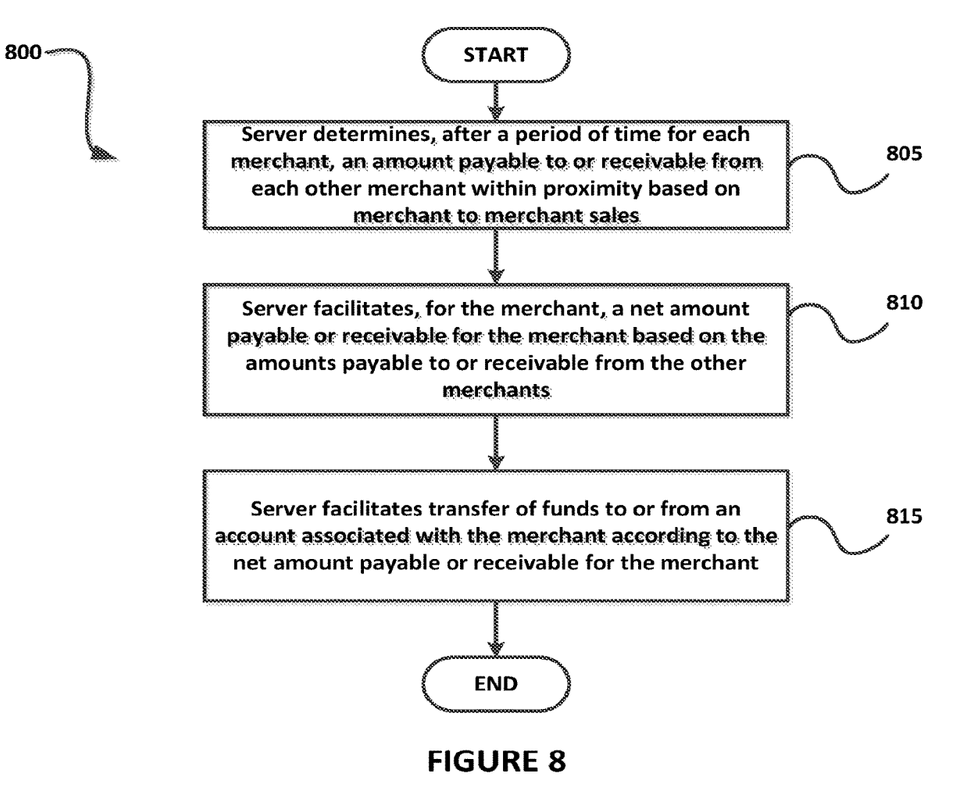
FIG. 8 is a flowchart representing a method of a server processing system performing bulk settlement of merchant to merchant sales over a period of time.

Referring to FIG. 8 there is shown a flowchart representing a method 800 of a server processing system 310 performing bulk settlement of merchant to merchant sales over a predefined period of time. In a preferred embodiment, the predefined period of time is a day.

In particular, at step 810, the method 800 includes the server processing system 310 determining, after the predefined period of time and for each merchant, an amount payable or receivable from each other merchant within proximity based on merchant to merchant sales. For example, a merchant may have purchased $100 of goods from a first merchant, sold $150 of goods to the first merchant, purchased $500 of goods from a second merchant, sold $200 of goods to the second merchant, purchased $200 of goods from a third merchant, and sold $50 of goods to the third merchant. It will be appreciated that the amounts purchased and sold preferably include multiple transactions, wherein only a bulk settlement for the plurality of transactions can be performed for efficiency purposes. The server processing system determines an amount payable or receivable for the merchant in relation to the first, second and third merchants. In this particular example, the amounts are $50 receivable from the first merchant (i.e. $150−100), $300 payable to the second merchant (i.e. $200−$500), and $150 receivable from the third merchant ($200−$50).

At step 820, the method 800 includes the server processing system 310 determining a net amount payable or receivable for the merchant based on the amounts payable or receivable for the other merchants. Continuing with the above example, the merchant is required to pay $100 ($50−$300+$150=−$100) in total to the other merchants.

At step 820, the method 800 includes the server processing system 310 facilitating transfer of funds based on the net amount determined for the merchant. Continuing with the example, the server processing system 310 can facilitate debiting the merchant's account for $100, such as a credit card or the like, with the net amount. The amount charged may also include a fee charged by the administrator of the server processing system 310. It will be appreciated that this process is advantageous as only a single administrative fee is charged in relation to the net amount payable or receivable rather than an administrative fee being charged for processing each merchant to merchant sale.

The server processing system 310 can be configured to receive, from at least some of the merchant devices, sales data. In particular, the sales data includes merchant to merchant sales. In addition, when a merchant sells a good that is in stock, the merchant can interact with the application 508 executing on the merchant device 320 to indicate to the server processing system 310 that a sale has occurred. In response to receiving sales data, the server processing system 310 updates the inventory data of the relevant merchants according to the sales data.

The sales data that is received by the server processing system 310 can be stored in the data store 330 for at least some of the merchants. The server processing system 310 can be configured to receive, from one of the merchant devices 320, a request for anonymous sales data for the one or more merchants located within the proximity of the respective merchant location. In response, the server processing system 310 generates, using the sales data stored in the data store and the proximity of the requesting merchant, anonymous sales data. The server processing system 310 then transfers the anonymous sales data to the respective merchant device 320 of the requesting merchant 325.

It will be appreciated that over time as a merchant receives new inventory, steps 620 to 640 can be repeatedly executed in order to add new products to the inventory data of the merchant or t update inventory amounts for existing products in the inventory data.

It will be appreciated that the merchants 325 are independent merchants.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A method for identifying inventory from distinct merchants from a first merchant device, the method including:
   sending, from the first merchant device to a server system, inventory data and a first merchant location to be stored in a data store;
   sending, from the first merchant device during an in-person sale transaction with a customer at the first merchant location, data indicative of a requested good that is not immediately deliverable at the first merchant location;
   receiving, from the server system, data for plotting a map interface at the first merchant device;
   rendering a graphical map interface on the first merchant device based on the received data, the interface showing one or more merchants locations relative to the first merchant location, wherein the one or more merchant locations have the requested good immediately deliverable and are located within a proximity of the first merchant location;
   detecting a user selection via the graphical map interface of a second merchant location;
   sending, from the first merchant device, the selection of the second merchant location to facilitate provisioning of the requested good;
   sending, to a second merchant device, a request to facilitate provision of the requested good to the customer; and
   transferring funds from the first merchant to the second merchant for facilitating provisioning of the requested good, wherein the requested good are sold to the customer at a retail price set by the second merchant.

2. The method of claim 1, further comprising:
   receiving a merchant sale price for the requested good at the second merchant location, wherein the customer of the first merchant location is charged the merchant sale price of the second merchant location for the facilitating the provision of the requested good to the customer.

3. The method of claim 1, further comprising:
   sending price data for goods at the first merchant location to the server system; and
   sending updated inventory data for the first merchant location to the server system.

4. The method of claim 1, further comprising:
   sending sales data for sales of goods to the server system; and
   sending, to the server system, a request for anonymous sales data for the one or more merchants located within a proximity of the first merchant location;
   generating, using the sales data stored in the data store and the proximity of the requesting merchant, anonymous sales data; and
   receiving, from the server system, the anonymous sales data associated the one or more merchants within the proximity of the first merchant location.

5. The method of claim 1, wherein the first merchant location and the second merchant location are associated with different merchants.

6. A first merchant device comprising:
a memory device;
a communication transceiver; and
a processor coupled to the memory device and the communication transceiver, the processor configured to
send, from the first merchant device to a server system, inventory data and a first merchant location to be stored in a data store;
send, from the first merchant device during an in-person sale transaction with a customer at the first merchant location, data indicative of a requested good that is not immediately deliverable at the first merchant location;
receive, from the server system, data for plotting a map interface at the first merchant device;
render a graphical map interface on the first merchant device based on the received data, the interface showing one or more merchants locations relative to the first merchant location, wherein the one or more merchant locations have the requested good immediately deliverable and are located within a proximity of the first merchant location;
detect a user selection via the graphical map interface of a second merchant location;
send, from the first merchant device, the selection of the second merchant location to facilitate provisioning of the requested good;
send, to a second merchant device, a request to facilitate provision of the requested good to the customer; and
transfer funds from the first merchant to the second merchant for facilitating provisioning of the requested good, wherein the requested good are sold to the customer at a retail price set by the second merchant.

7. The first merchant device of claim 6, wherein the processor is further configured to:
receive a merchant sale price for the requested good at the second merchant location, wherein the customer of the first merchant location is charged the merchant sale price of the second merchant location for the facilitating the provision of the requested good to the customer.

8. The first merchant device of claim 6, wherein the processor is further configured to:
send price data for goods at the first merchant location to the server system; and
send updated inventory data for the first merchant location to the server system.

9. The first merchant device of claim 6, wherein the processor is further configured to:
send sales data for sales of goods to the server system; and
send, to the server system, a request for anonymous sales data for the one or more merchants located within a proximity of the first merchant location;
generate, using the sales data stored in the data store and the proximity of the requesting merchant, anonymous sales data; and
receive, from the server system, the anonymous sales data associated the one or more merchants within the proximity of the first merchant location.

10. The first merchant device of claim 6, wherein the first merchant location and the second merchant location are associated with different merchants.

11. A non-transitory computer storage medium including executable instructions which, when executed by one or more processors, causes the processor to:
send, from a first merchant device to a server system, inventory data and a first merchant location to be stored in a data store;
send, from the first merchant device during an in-person sale transaction with a customer at the first merchant location, data indicative of a requested good that is not immediately deliverable at the first merchant location;
receive, from the server system, data for plotting a map interface at the first merchant device;
render a graphical map interface on the first merchant device based on the received data, the interface showing one or more merchants locations relative to the first merchant location, wherein the one or more merchant locations have the requested good immediately deliverable and are located within a proximity of the first merchant location;
detecting a user selection via the graphical map interface of a second merchant location;
send, from the first merchant device, the selection of the second merchant location to facilitate provisioning of the requested good;
send, to a second merchant device, a request to facilitate provision of the requested good to the customer; and
transfer funds from the first merchant to the second merchant for facilitating provisioning of the requested good, wherein the requested good are sold to the customer at a retail price set by the second merchant.

12. The storage medium of claim 11, further comprising executable instructions to cause the processor to:
receiving a merchant sale price for the requested good at the second merchant location, wherein the customer of the first merchant location is charged the merchant sale price of the second merchant location for the facilitating the provision of the requested good to the customer.

13. The storage medium of claim 11, further comprising instructions to cause the processor to:
send price data for goods at the first merchant location to the server system; and
send updated inventory data for the first merchant location to the server system.

14. The storage medium of claim 11, further comprising executable instructions to cause the processor to:
send sales data for sales of goods to the server system; and
send, to the server system, a request for anonymous sales data for the one or more merchants located within a proximity of the first merchant location;
generate, using the sales data stored in the data store and the proximity of the requesting merchant, anonymous sales data; and
receive, from the server system, the anonymous sales data associated the one or more merchants within the proximity of the first merchant location.

15. The storage medium of claim 11, wherein the first merchant location and the second merchant location are associated with different merchants.

* * * * *